3,109,009
METHOD FOR PREPARATION OF 2α-ALKYL-19-NOR-TESTOSTERONE AND THE INTERMEDIATES OBTAINED THEREFROM
Gerard Nominé, Noisy-le-Sec, Robert Bucourt, Villiers le Bel, and Jean Tessier, Paris, France, assignors, by mesne assignments, to Roussel-UCLAF, S.A., Paris, France, a corporation of France
No Drawing. Filed Nov. 14, 1961, Ser. No. 152,180
Claims priority, application France Dec. 16, 1960
10 Claims. (Cl. 260—397.4)

The present invention relates to the preparation of steroids alkylated in the 2 position. It more particularly relates to 2α-alkyl-19-nor-testosterone, esters thereof and the process of preparing these compounds.

An object of the present invention is the development of a process of preparation by total synthesis of derivatives alkylated in the 2 position of 19-nor-testosterone of the formula:

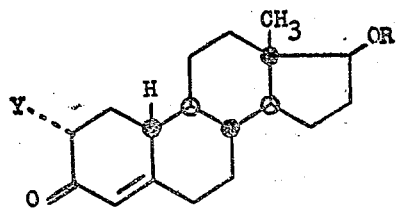

in which Y represents a lower alkyl radical and R represents a radical selected from the group consisting of hydrogen, an acyl radical of an organic carboxylic acid having from 1 to 18 carbon atoms and an acyl radical of a mineral acid.

A further object of the present invention is the obtention of 19-nor-testosterone derivatives having the formula:

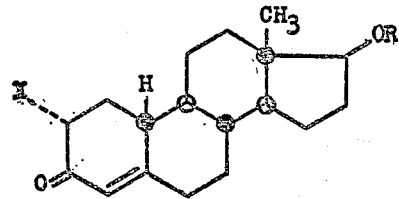

wherein X represents an alkyl radical having from 2 to 7 carbon atoms and R represents a radical selected from the group consisting of hydrogen, an acyl radical of an organic carboxylic acid having from 1 to 18 carbon atoms and an acyl radical of a mineral acid.

Another object of the invention is the production of the intermediate $\Delta^{1(9)}$-3-methyl-7-oxo-8-(3'-chloro-2'-lower alkyl-2'-butenyl)-3,4-[3-'acyloxy-cyclopentano-(2',1')]-octahydronaphthalene compound of the formula:

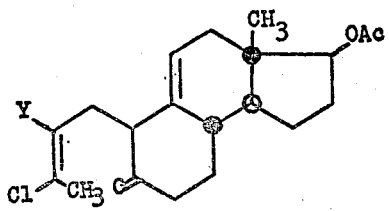

wherein Ac represents the acyl radical of an organic carboxylic acid having from 1 to 18 carbon atoms and Y represents a lower alkyl radical.

Another object of the invention is the production of the intermediate $\Delta^8$-3-methyl-7-oxo-8-(3'-oxo-2'-lower alkyl - butyl) - 3,4 - [3' - acyloxy - cyclopentano - (2', 1')]-octahydronaphthalene compounds of the formula:

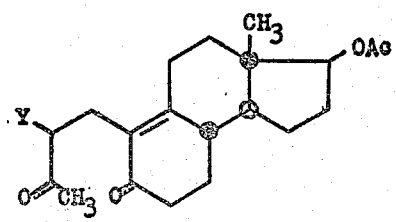

wherein Ac represents the acyl radical of an organic carboxylic acid having from 1 to 18 carbon atoms and Y represents a lower alkyl radical.

A further object of the invention is the production of the intermediate 3-methyl-7-oxo-8-(3'-oxo-2'-lower alkyl-butyl) - 3,4 - [3' - acyloxy - cyclopentano-(2',1')] - decahydronaphthalene compounds of the formula:

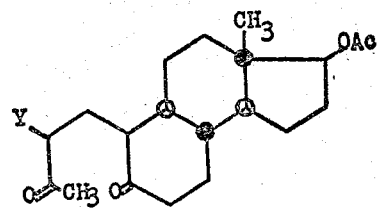

wherein Ac represents the acyl radical of an organic carboxylic acid having from 1 to 18 carbon atoms and Y represents a lower alkyl radical.

A still further object is the production of the novel condensation composition comprising a solution of 1-iodo-3-chloro-2-lower alkyl-2-butene in dimethylformamide.

These and other objects of the invention will become more apparent as the description thereof proceeds.

We have now found a process for the total synthesis of 2α-methyl-19-nor-testosterone, either racemic or optically active as well as other 2α-lower alkyl-19-nor-testosterone derivatives. According to this process, 2α-lower alkyl-19-nor-testosterone compounds are produced starting from a $\Delta^{1(9),7}$-3-methyl-7-amino-3,4-[3'-acyloxy-cyclopentano - (2',1')] - hexahydronaphthalenic compound having the Formula I:

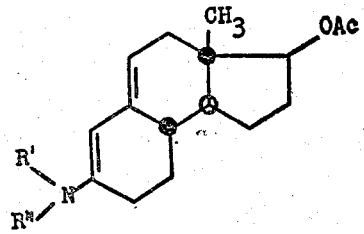

I wherein Ac represents the acyl radical of an organic carboxylic acid having from 1 to 18 carbon atoms, R' by itself represents an alkyl radical having from 1 to 8 carbon atoms, R" by itself represents an alkyl radical having from 1 to 8 carbon atoms and R' and R" taken together represent a bridging radical selected from the group consisting of alkylene having from 4 to 5 carbon atoms and alkyloxyalkylene having 4 carbon atoms.

Compounds of Formula I are obtained according to the process of total synthesis described in copending, commonly-assigned United States Patent 3,047,615 and patent application Serial No. 110,328, filed May 16, 1961. This application describes a process of reacting a $\Delta^{9(10)}$-3-methyl - 7 - oxo - 3,4-[3' - acyloxy - cyclopentano - (2', 1')]-octahydronapthalene with a secondary amine in an inert organic solvent and recovering the compounds of Formula I. The said processes of these applications can be indicated by the following flow diagram:

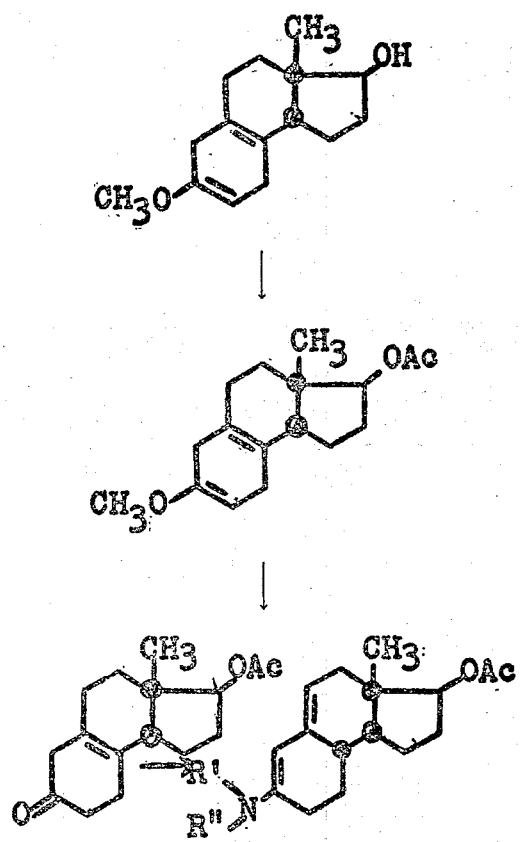

The different substituents have the above-cited significance.

The process, which is the object of the present invention, consists essentially in condensing compounds of Formula I with a 1-halo-3-chloro-2-lower alkyl-2-butene in order to obtain a $\Delta^{1(9)}$-3-methyl-7-oxo-8-(3'-chloro-2'-lower alkyl-2'-butenyl) - 3,4 - [3'-acyloxy-cyclopentano-(2',1')] - octahydronaphthalene compound having the Formula II:

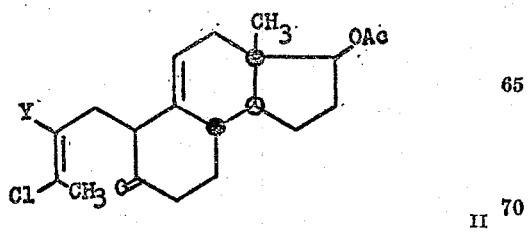

where Ac has the above assigned meaning and Y represents a lower alkyl radical.

Hydrolysis of this latter compound of Formula II gives a $\Delta^8$- 3-methyl-7-oxo-8-(3'-oxo-2'-lower alkyl-butyl)-3,4- [3'-acyloxy-cyclopentano - (2',1')] - decahydronaphthalene compound of Formula III:

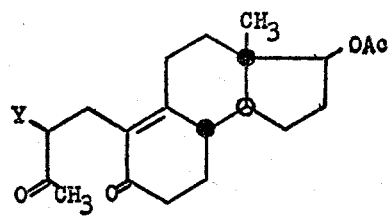

where Y and Ac have the above assigned meanings. The double bond in the 8 position of the dione III is reduced to give a 3-methyl-7-oxo-8-(3'-oxo-2'-lower alkyl-butyl)-3,4-[3'-acyloxy-cyclopentano - (2',1')] - decahydronaphthalene compound of Formula IV:

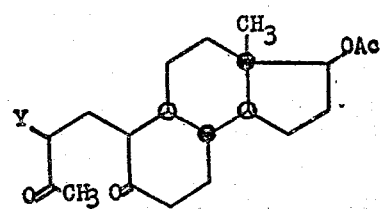

where Y and Ac have the above assigned meanings. The saturated product resulting (Compound IV) is cyclized in an acidic media to furnish the corresponding 17 position ester of 2α-alkyl-19-nor-testosterone which may be saponified, if desired, into the free alcohol.

Table I shows a flow diagram of the course of the synthesis.

TABLE I

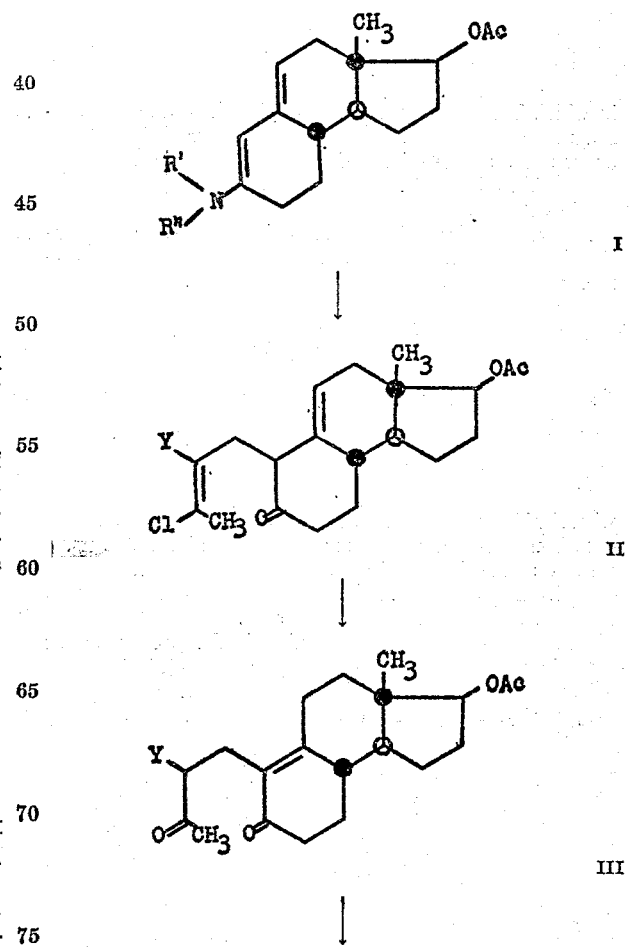

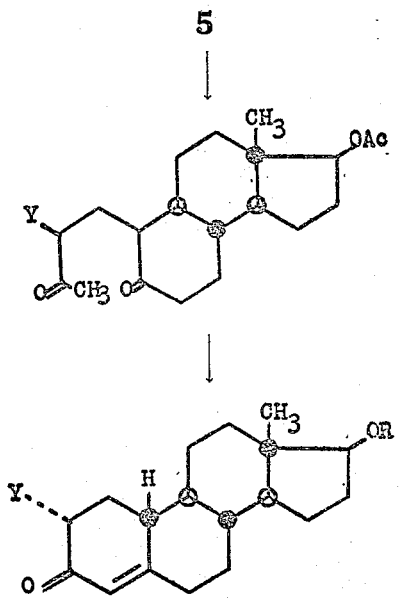

where Y, Ac and R have the above assigned meanings.

As starting compounds we can use advantageously $\Delta^{1(9),7}$-3-methyl-7-pyrrolidyl - 3,4 - [3' - benzoyloxy-cyclopentano-2',1')]-hexahydronaphthalene, which is a compound of Formula I in which R' and R" represent together the remainder of the pyrrolidine cycle and Ac is the benzoyl radical. However, corresponding 3'-acyloxy derivatives such as the 3'-acetoxy, 3'-propionyloxy, 3'-butanoyloxy, 3'-trimethylacetoxy, 3'-phenoxyacetoxy, etc., may be employed, in either the racemic or optically active form. Additionally, corresponding 7-amino derivatives such as the 7-piperidyl, 7-morpholyl, 7-dimethylamino, etc., may be employed.

The condensation of the starting Compound I with a 1-halo-3-chloro-2-lower alkyl-2-butene such as 1-iodo-3-chloro-2-methyl-2-butene or the corresponding dichloro derivative is effected advantageously by placing the required reactant in solution in an inert organic solvent such as dimethylformamide.

It is particularly advantageous to take as the 2-alkyl-2-butene derivative 1-iodo-3-chloro-2-lower alkyl-2-butene which can be prepared in situ in the course of the reaction by adding an alkali metal iodide such as potassium iodide to a solution of 1,3-dichloro-2-lower alkyl-2-butene in an N,N-di-lower alkyl-lower alkanoylamide such as dimethylformamide.

The condensation product, Compound II, is next subjected to the action of a hydrolyzing agent such as, for example, concentrated sulfuric acid which gives the desired Compound III.

The hydrolysis of the 3'-chloro-2'-lower alkyl-2'-butenyl side chain can be effected with any hydrolyzing agent that will cause the chlorine radical to be replaced with a hydroxyl radical and will simultaneously cause the enolic hydroxy group formed to revert to the more stable ketone. It is preferable to use a concentrated aqueous solution of a strong mineral acid, such as concentrated sulfuric acid. The reaction occurs at about room temperature.

The catalytic reduction of Compound III is preferably effected by a catalyst such as palladized carbon at a pH range from the neutral point to a strongly basic pH and the hydrogenation is effected at atmospheric pressures or elevated pressures. No increase in temperature is required although elevated temperatures may be used. The reduction is effected in the presence of an inert organic solvent.

In the preferable mode of execution of the catalytic reduction step, the reduction is effected at a strongly basic pH. The optimum basicity being at a pH of about 11 with a catalyst based on palladium hydroxide. Particularly, the catalytic reduction is effected in the presence of palladized carbon prepared from palladium hydroxide in a basic media in which the basicity of the reaction media is obtained by the addition thereto of triethylamine sufficient to bring the pH to about 11. The reaction takes place upon introduction of hydrogen at room temperature and atmospheric pressure.

The cyclization of Compound IV is effected at room temperature with the aid of concentrated hydrochloric acid. The operation is preferably carried out in an acetic acid medium under anhydrous conditions.

A preferred mode of execution of the process of the invention is to employ the benzoic acid ester of starting Compound I, but other esters of organic carboxylic acids having 1 to 18 carbon atoms, such as the alkanoates, for example, the acetate, the trimethylacetate, the propionate, the 4,4-dimethyl-pentanoate, the laurate; the alkenoates, such as the 10-undecenoate; the cycloalkyl alkanoates, for example, the β-cyclopentylpropionate; the arylalkanoates, the phenyl-propionate; the cycloalkanoates, the hexahydrobenzoate, the hexahydrosteraphthalate; and other phenyl-carboxylic acids may be used without departing from the scope of the invention.

It will be understood, however, that it is possible, if necessary, to saponify the esters thus obtained by this mode of execution and to obtain thereby the free 2α-lower alkyl-19-nor-testosterone.

It is also understood that 2α-lower alkyl-19-nor-testosterone may be esterified according to known procedures with organic carboxylic acids or mineral acids.

The following example describes a method of execution of the process of the invention in the particular case of the preparation of 2α-methyl-19-nor-testosterone. The 2α-methyl-19-nor-testosterone is (D. H. Peterson et al., Chemistry and Industry (1960), p. 1301) used in the synthesis of 2-methyl-estrone and of 2-methylestradiol which have an estrogenic activity. Thus 2α-methyl-19-nor-testosterone is transformed microbiologically by septomyxa affinis (ATCC 6737) to 2-methyl-estrone which by simple chemical reduction accomplished with sodium borohydride, yields 2-methyl-estradiol.

The example, given hereinafter as purely indicative presents thus no limitive characteristics.

EXAMPLE

*Preparation of 2α-Methyl-19-Nor-Testosterone*

STEP A.—CONDENSATION OF $\Delta^{1(9),7}$-3-METHYL-7-PYRROLIDYL-3,4-[3'-BENZOYLOXY - CYCLOPENTANO - (2', 1')]-HEXAHYDRONAPHTHALENE, I (Ac=C₆H₅CO, R' AND R"=THE PYRROLIDYL RADICAL) WITH 2-METHYL-1,3-DI-CHLORO-2-BUTENE 4.5 gm. of $\Delta^{1(9),7}$-3-methyl-7-pyrrolidyl-3,4-[3'-benzoyloxy-cyclopentano-(2',1')]-hexahydronaphthalene, I, Ac =C₆H₅CO, having a melting point of 126.5° C. and a specific rotation [α]$_D^{20}$=+150° (c.=1% in benzene), obtained according to U.S. patent application Serial No. 110,328, were introduced into 24 cc. of dimethylformamide and 2.023 gm. of potassium iodide were added. 2.5 gm. of 2-methyl-1,3-dichloro-2-butene in solution in 7 cc. of dimethylformamide were added to the reaction mixture.

The reaction mixture was agitated under an atmosphere of nitrogen at room temperature for a period of one-half hour. After addition of 15 cc. of water, the mixture was agitated for a period of one and one-half hours, then poured into water and extracted with ether. The ethereal extracts were combined, filtered and dried, then evaporated to dryness under vacuum. The residue was subjected to chromatography over silica gel and elution with methylene chloride containing 0.8% of acetone. 3.06 gm. (being a 60% yield) of $\Delta^{1(9)}$-3-methyl-7-oxo-8-(3'-chloro-2' - methyl - 2'-butenyl)-3,4-[3'-benzoyloxy-cyclopentano-(2',1')]-octahydronaphthalene, II, Ac=C₆H₅CO, Y =CH₃, were obtained. The product, which is amorphous, is utilized as such for the next step of the synthesis.

This compound is not described in the literature.

STEP B.—HYDROLYSIS 3.06 gm. of $\Delta^{1(9)}$ - 3 - methyl - 7-oxo-8-(3'-chloro-2'- methyl - 2' - butenyl)-3,4-[3'-benzoyloxy-cyclopentano-(2' 1')]-octahydronaphthalene, II, Ac=C$_6$H$_5$CO, Y=CH$_3$, in 3 cc. of ether were added to 25 cc. of pure sulfuric acid. After several minutes, the mixture was poured into a mixture of water, ice and sodium bicarbonate, then extracted with methylene chloride. The extracts were dried over sodium sulfate and evaporated to dryness. 2.8 gm. of product were obtained which product was subjected to chromatography over silica gel. Elution with methylene chloride containing 2.5% of acetone furnished 2.16 gm. of amorphous Δ$^8$-3-methyl-7-oxo-8-(3'-oxo-2'-methyl-butyl) - 3,4-[3'-benzoyloxy-cyclopentano-(2'-1')]-octahydronaphthalene, III, Ac=C$_6$H$_5$CO, Y=CH$_3$, having a specific rotation $[\alpha]_D^{20}$=+47.5° (c.=0.77% in methanol).

This compound is not described in the literature.

STEP C.—REDUCTION 38 mg. of carbon black containing 15% of palladium hydroxide were placed in suspension in 30 cc. of 95% ethanol. The pH was brought to 11 by addition of 3 cc. of a 10% solution of triethylamine in ethanol, then the mixture was hydrogenated for a period of several minutes. 380 mg. of Δ$^8$-3-methyl-7-oxo-8-(3'-oxo-2'-methyl-butyl)-3,4 - [3'-benzoyloxycyclopentano-(2',1')]-octahydronaphthalene, III, Ac=C$_6$H$_5$CO, Y=CH$_3$, dissolved in 8 cc. of 95% ethanol, were introduced and the hydrogenation was continued for a period of one hour. The reaction mixture was filtered and the filtrate was evaporated to dryness. 381 mg. of a product were obtained which was subjected to chromatography over silica gel. On elution with methylene chloride containing 1.2% of acetone, 333 mg. (being an 87% yield) of 3-methyl-7-oxo-8-(3'-oxo-2'-methyl-butyl) - 3,4-[3'-benzoyloxy-cyclopentano-(2',1')]-decahydronaphthalene, IV, Ac=C$_6$H$_5$CO, Y=CH$_3$, were obtained, which were utilized without further purification in the next step of the synthesis.

This product is not described in the literature.

STEP D.—CYCLIZATION 173 mg. of 3-methyl-7-oxo-8-(3'-oxo-2'-methyl-butyl)-3,4-[3'-benzoyloxy-cyclopentano-(2',1')]-decahydronaphthalene, IV, Ac=C$_6$H$_5$CO, Y=CH$_3$, were dissolved in 3.4 cc. of acetic acid. 0.22 cc. of 22° Bé. hydrochloric acid was added thereto and the reaction mixture was allowed to stand for a period of twenty-four hours at room temperature.

The mixture was then poured into a solution of sodium bicarbonate and extracted with ether. The ethereal extract was washed with water, dried and evapolated to dryness. The residue was purified by trituration with ether and crystallization from ethanol. 66 mg. of the benzoate of 2α-methyl-19-nor-testosterone were obtained. The product occurs in the form of white crystals having a melting point of 185.5° C. and a specific rotation $$[\alpha]_D^{20}=+126°$$

(c.=0.5% in chloroform).
Ultraviolet spectrum:

$$\lambda_{max}.\ 234\ m\mu\ E_{1\ cm.}^{1\%}=694$$

This compound is not described in the literature.

STEP E.—SAPONIFICATION 0.1 gm. of the benzoate of 2α-methyl-19-nor testosterone, V, Ac=C$_6$H$_5$CO, Y=CH$_3$, was heated at reflux for a period of one hour in 1 cc. of methanol containing 21 mg. of potassium hydroxide. On extraction, distillation to dryness, then crystallization in isopropyl ether, 2α-methyl-19-nor-testosterone was obtained, melting at 177° C. and identical to the product described by Paterson et al., Chem and Ind., (1960), p. 1301.

The preceding example is not to be construed as limiting the invention. It is evident to one skilled in the art that temperatures, the nature of the solvents or the organic carboxylic acid ester may be varied or that equivalent techniques may be used without departing from the spirit of the invention or the scope of the appended claims.

We claim:
1. Δ$^{1(9)}$-3-methyl-7-oxo-8-(3'-chloro-2'-lower alkyl-2'-butenyl)-3,4-[3'-acyloxy-cyclopentano - (2',1')] - octahydronaphthalene compounds of the formula:

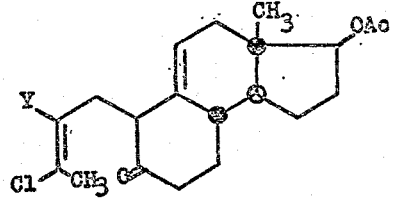

wherein Ac represents the acyl radical of an organic carboxylic acid having from 1 to 18 carbon atoms selected from the group consisting of alkanoic acids, alkenoic acids, cycloalkyl alkanoic acids, arylalkanoic acids, cycloalkanoic acids, and phenylcarboxylic acids and Y represents a lower alkyl radical.

2. Δ$^{1(9)}$-3-methyl-7-oxo-8-(3'-chloro-2'-methyl - 2' - butenyl)-3,4-[3'-benzoyloxy-cyclopentano-(2',1')] - octahydronaphthalene.

3. The process of producing 2α-lower alkyl-19-nor-testosterone derivatives of the formula:

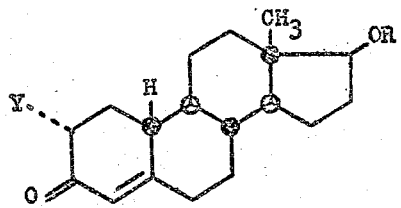

in which Y represents a lower alkyl radical and R represents a radical selected from the group consisting of hydrogen and an acyl radical of an organic carboxylic acid having from 1 to 18 carbon atoms selected from the group consisting of alkanoic acids, alkenoic acids, cycloalkyl alkanoic acids, arylalkanoic acids, cycloalkanoic acids, and phenylcarboxylic acids, which comprises the steps of (a) reacting a Δ$^{1(9),7}$-3-methyl-7-amino-3,4-[3'-acyloxy - cyclopentano - (2',1') - hexahydronaphthalene compound having the formula:

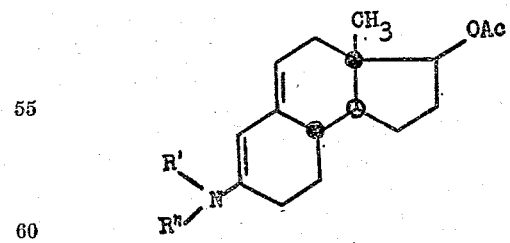

wherein Ac represents the acyl radical of an organic carboxylic acid having from 1 to 18 carbon atoms selected from the group consisting of alkanoic acids, alkenoic acids, cycloalkyl alkanoic acids, arylalkanoic acids, cyloalkanoic acids, and phenylcarboxylic acids, R' by itself represents an alkyl radical having from 1 to 8 carbon atoms, R" by itself represents an alkyl radical having from 1 to 8 carbon atoms and R' and R" taken together represent a bridging radical selected from the group consisting of alkylene having from 4 to 5 carbon atoms and alkyloxyalkylene having 4 carbon atoms with a 1-halo-3-chloro-2-lower alkyl-2-butene in the presence of an N,N-di-lower alkyl-lower alkanoylamide, (b) hydrolyzing the Δ$^{1(9)}$-3-methyl-7-oxo-8-(3'-chloro-2'-lower alkyl-2'-butenyl)-3,4-[3'-acyloxy - cyclopentano - (2',1')] - octahydronaphthalene compound having the formula:

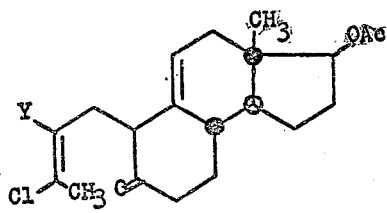

where Ac has the above assigned meaning and Y represents a lower alkyl radical with a concentrated aqueous solution of a strong mineral acid, (c) reducing the double bond in the 8 position of the $\Delta^8$-3-methyl-7-oxo-8-(3'-oxo-2'-lower alkyl-butyl)-3,4-[3'-acyloxy-cyclopentano - (2', 1')]-octahydronaphthalene compound of the formula:

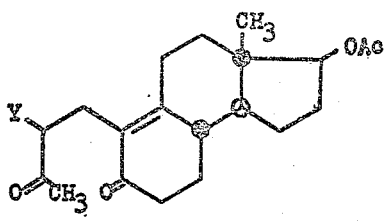

where Y and Ac have the above assigned meanings, by catalytic hydrogenation by means of a palladized catalyst in a neutral to strongly basic reaction media, (d) reacting the 3-methyl-7-oxo-8-(3'-oxo-2'-lower alkyl-butyl)-3,4-[3'-acyloxy-cyclopentano-(2',1')] - decahydronaphthalene compound of formula:

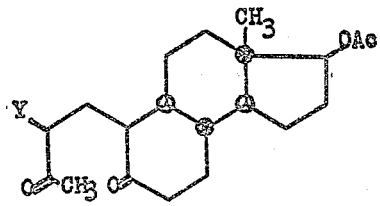

where Y and Ac have the above assigned meanings with concentrated hydrochloric acid in an acidic media and (e) recovering said 2α-lower alkyl-19-nor-testosterone derivatives.

4. The process of claim 3 wherein said 1-halo-3-chloro-2-lower alkyl-2-butene utilized is 1-iodo-3-chloro-2-methyl-2-butene and a 2α-methyl-19-nor-testosterone derivative is recovered.

5. The process of claim 3 wherein said $\Delta^{1(9),7}$-3-methyl-7-amino-3,4-[3'-acyloxy-cyclopentano-(2',1')] - hexahydronaphthalene compound utilized is $\Delta^{1(9),7}$-3-methyl-7-pyrrolidyl-3,4 - [3' - benzoyloxy - cyclopentano - (2',1')]-hexahydronaphthalene.

6. The process of claim 3 (a) wherein said 1-halo-3-chloro-2-lower alkyl-2-butene is a 1-iodo derivative formed in situ from 1,3-dichloro-2-lower alkyl-2-butene and an alkali metal iodide in the presence of dimethylformamide.

7. The process of claim 3 (b) wherein said strong acid is sulfuric acid.

8. The process of claim 3 (c) wherein said reducing step is effected at a pH of about 11 in the presence of an inert organic solvent.

9. The process of claim 3 (d) wherein said strong acid is concentrated hydrochloric acid and the reaction is effected at room temperature in an acetic acid medium.

10. The process of claim 3 (e) wherein 2α-lower alkyl-19-nor testosterone is recovered.

References Cited in the file of this patent

UNITED STATES PATENTS 2,989,549  Pederson et al. _____ June 20, 1961
2,997,488  Jongh _____ Aug. 22, 1961

OTHER REFERENCES

Velluz et al.: "Compt. Rend. Acad. Sci.," vol. 252, No. 25, June 1961.
Velluz et al.: (2) Angew. Chemie, vol. 72, Oct. 7, 1960. Pages 725–730 relied on.